No. 757,493. PATENTED APR. 19, 1904.
G. D. PETTINGELL.
FLEXIBLE METAL PIPE COUPLING FOR CONNECTING THE AIR AND STEAM PIPES OF RAILWAY CARS.
APPLICATION FILED JAN. 18, 1902.
NO MODEL.
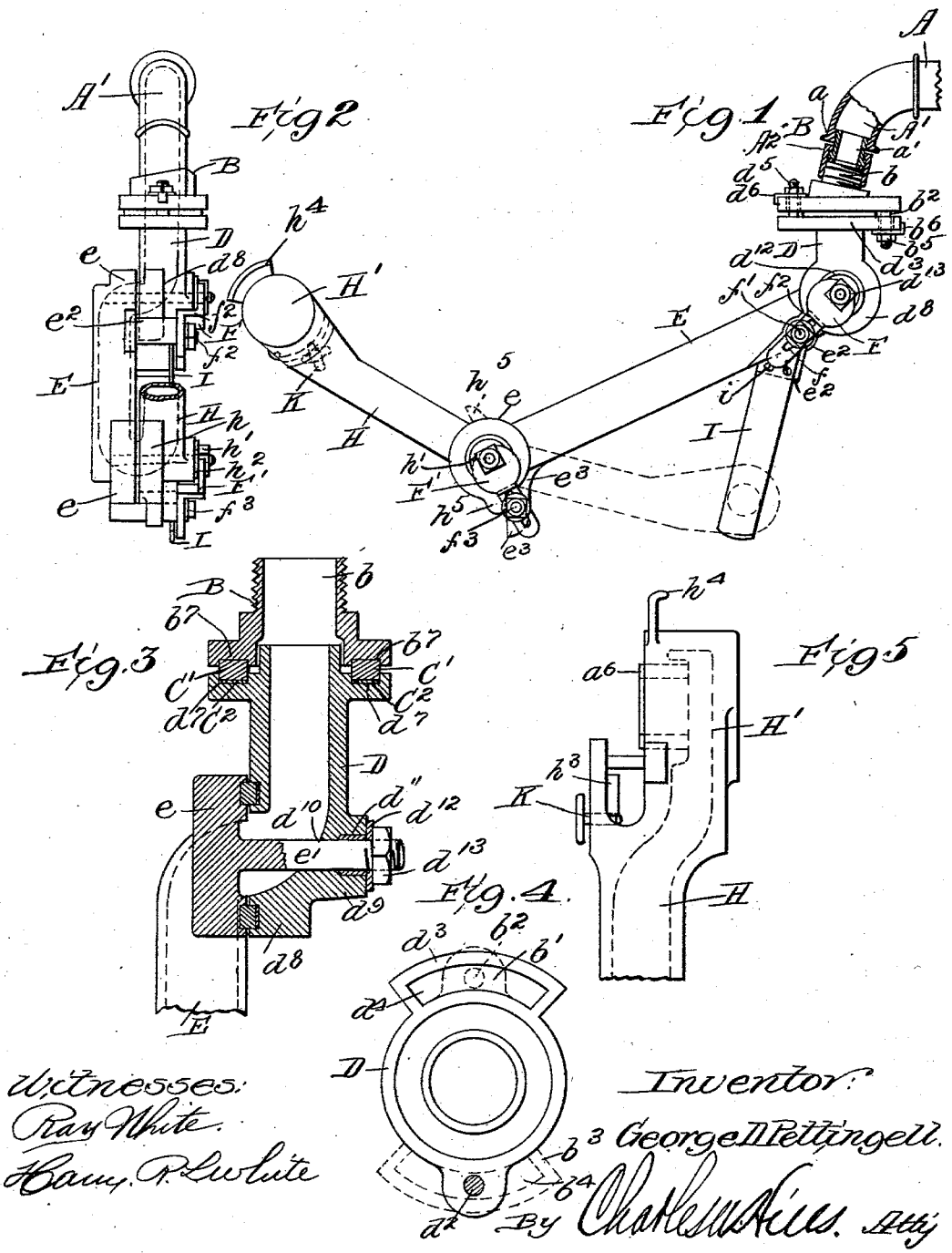

No. 757,493. Patented April 19, 1904.

UNITED STATES PATENT OFFICE.

GEORGE D. PETTINGELL, OF JEFFERSON, IOWA, ASSIGNOR OF ONE-HALF TO HENRY C. LAUB, OF DENISON, IOWA.

FLEXIBLE METAL PIPE-COUPLING FOR CONNECTING THE AIR AND STEAM PIPES OF RAILWAY-CARS.

SPECIFICATION forming part of Letters Patent No. 757,493, dated April 19, 1904.

Application filed January 18, 1902. Serial No. 90,275. (No model.)

*To all whom it may concern:*

Be it known that I, GEORGE D. PETTINGELL, of Jefferson, in the county of Greene and State of Iowa, have invented certain new and useful Improvements in Flexible Metal Pipe-Couplers for Connecting the Air and Steam Pipes of Railway-Cars, of which the following is a specification.

The object of my invention is to provide a flexible metal pipe connection comprising several pipe-sections, joined together in a novel manner and adapted to be affixed securely in a simple manner to any of the fixed pipes of a railway-car and provided with joints which will allow the pipe-sections to be swung both upon a horizontal joint and upon vertical joints and also provided at the free end with a coupling-head which will adapt the said device to be readily secured to and operate together with a similar device upon an adjoining car to thus make a complete operative pipe-coupling between the cars, which will yield in any and all directions to adjust the pipe connections to the constant variable movements of the cars when moving.

In the accompanying drawings, Figure 1 illustrates a side elevation of a single coupler-section embodying my invention secured to the usual elbow of a train-pipe; Fig. 2, an end elevation thereof; Fig. 3, an enlarged sectional elevation of the vertical horizontally-oscillating section, its fixed train-pipe section, and the adjacent end of the vertically-oscillating middle section of the coupler; Fig. 4, a plan view of the horizontal oscillating plate of the vertical section, shown by full lines, and the corresponding horizontal oscillating plate of the fixed train-pipe section of the coupler, shown by dot-lines; Fig. 5, an enlarged and elevated longitudinal sectional elevation of the joint between the middle section and the end section of the coupler.

The train-pipe A is secured fixedly to the under side or bottom of the car and is provided at its ends with an inclined elbow A', having an outer collar $a$ and an inner collar and packing-ring $a'$, upon which nut $A^2$ is engaged and threaded to fit the thread-stub of the fixed horizontal joint-section B of the coupler. The fixed horizontal joint-section B has an angular pipe-stub $b$, threaded to receive the nut $A^2$ of the train-pipe below, and a lug $b'$ and stud-bolt $b^2$, projecting upon one side, and an oppositely-disposed horizontal segment-plate $b^3$, having a segment-slot $b^4$ upon the opposite side thereof, the latter to receive a stud-bolt $d^2$, projecting from a lug on a vertical pipe-section D, which passes through the said segment-slot $b^4$ and is fitted upon its threaded end with a nut $d^5$ and washer $d^6$, and the stud-bolt $b^2$ passes in a like manner through the segment-slot $d^4$ of a horizontal segment-plate $d^3$ upon the horizontal face of the section D, the stud-bolt $b^2$ having a threaded end, upon which are fitted a nut $b^5$ and a washer $b^6$, by which the vertical pipe-section D is securely held upon the fixed joint-section B and allowed to oscillate thereon a distance limited and controlled by the length of the segment-slots in the horizontal segment-plates. The washers $b^6$ $d^6$ have turned-down lips which lap over the edges of the horizontal flanges to prevent them from turning thereon when the plates oscillate, and thereby prevent the nuts from being turned and loosened on the ends of the bolts. A circular gutter $b^7$, faced off truly on the bottom, and a circular gutter $d^7$, also faced off truly on the bottom of said fixed section B and oscillating section D, receive, respectively, a rubber washer C' and a leather washer $C^2$, the action of the rubber washer being to firmly hold the leather washer from turning and giving an elastic pressure thereon, while the smooth hard face of the leather washer will fit closely upon the true face of the gutter $d^7$, thus allowing the latter to oscillate freely without injuring the rubber, the latter serving to press the leather, as with a pad, firmly upon the face of the joint to thus insure a complete air and steam tight joint and at the same time a freely-oscillating connection.

The vertical pipe-section D has a vertical joint-section comprising a joint-cup $d^8$, having a hub $d^9$, bored at $d^{10}$ and provided with a packing-recess $d^{11}$ therein, the said bore being adapted to receive a stud-bolt $e'$ on a similar joint-cup $e$ of a middle pipe-section E, hereinafter described. The stud-bolt $e'$ passes through the bore $d^{10}$ of the hub $d^9$ of the joint-cup $d^8$ and is held thereon by a washer $d^{12}$ and nut $d^{13}$, which holds the packing in place. The nut is securely held from turning on the bolt by means of a wrench F, having a slot $f$ in the handle, through which a stud-bolt $f'$ passes and screws into a post-lug $e^2$, cast onto the pipe-section near the joint-cup $e$ thereof. The wrench F has an offset or neck $f^2$, which reaches up to the level of the nut from the post-lug $e^2$ on the pipe, and the slot $f$ in the handle allows the wrench to be moved into and out of engagement with the nut without removing it from the lug. Both ends of the middle section E are provided alike with a joint-cup $e$, having stud-bolts $f'$ thereon and post-lugs $e^2$ $e^3$ at the opposite ends thereof.

The coupling-head section H has a joint-cup $h$ at one end, which corresponds in every respect with the cup $d^8$ and is secured to the joint-cup $e$ of the vertically-oscillating end of section E and is secured thereto by a nut $h'$ and washer $h^2$, and a wrench F', similar to the wrench F, is securely held upon the post-lug $e^3$ of the middle pipe-section E by a stud-bolt $f^3$, thus allowing both the middle and end pipe-sections E and F to swing in a vertical plane on the connecting cup-joints and also to swing both together laterally or across the end of the car upon the horizontal joints between the vertical section D and the fixed section B of the coupler, thus allowing the coupler-heads H' of the two sections H upon the adjoining cars to be swung both vertically and horizontally until they are brought together and interlocked in a manner similar to that of the ordinary rubber-hose coupling, the coupler-heads H' being similar to each other in every respect, each having an overhanging slightly-inclined segment-flange $h^3$ upon the one cup-section to engage with an oppositely-inclined segment rim-flange $h^4$ upon the other cup-section. The joint-cup $h$ of the head-section H has a stop-lug $h^5$ projecting therefrom, which engages the post-lug $e^3$ of the pipe-section E, and thus prevents said sections from turning past their operative positions when the pipe-sections are extended to their full length of movement, the said stop-lug $h^5$ also serving to limit the reverse movement of the coupler-head section H, the latter being thus adapted to be lifted vertically and folded back past the position in which the middle pipe-section is held, as shown in dotlines in Fig. 1, thus supporting the folded section closely together and out of the way when not in use. The raised and rearwardly-inclined position in which the pipe-section H is thus held will relieve the joints from jar and hammer when in motion, due to the weights of the coupler-head, and the latter is also held and its open face covered completely by means of a flat spring cover-plate I, secured by bolts $i$ to the post-lug $e'$ of the middle pipe-section at the non-vibrating or upper end thereof, the said spring-plate being held tangent to the arc of movement of the gasket $a^6$ upon the face of the coupler-head H', the free end of the spring-plate being slightly inclined to thus bear gradually with greater pressure against the said face or gasket as the head reaches the extreme end of its movement.

The coupling-heads each have a set-screw K passing through the overhanging segment-flange $h^3$, thus to press upon each side of the joint-gasket should the latter fail to hold the air or steam and make a perfect joint.

The cover-plate I closes the opening in the coupler-head and serves completely to exclude all dust, grit, and cinders from the pipes which would otherwise work their way through the pipes of the air-brake mechanism and cut and destroy the working parts of the engineer's valve, triple valve, and other parts of the air-brake mechanism, thus rendering such mechanism useless.

I claim as my invention and desire to secure by Letters Patent—

1. In a flexible pipe-coupling, the combination with a fixed section of a horizontally-oscillating section, complemental faces on the adjacent ends of said sections, oppositely-disposed segmental slots therein, bolts rigidly engaged on said faces adapted to slidably engage in said slots and hold the sections in close contact, a plurality of vertically-oscillating sections and means for folding and closing said sections when not in use.

2. In a device of the class described, the combination with a fixed section, of a horizontal plate thereon, a segmental slot in said plate, a horizontally-oscillating section provided with a horizontal plate, a segmental slot thereon, a bolt rigidly fixed on said plates adapted to slidingly engage in the slots, a plurality of oscillating sections, a coupling-head on the free end thereof and means for closing said head when not in use.

3. In a flexible pipe-coupling the combination with a plurality of pipe-sections, of laterally-opening joint-cups thereon, a packing-seat in each cup, a two-part packing-ring therein, an integral bolt in one of said cups journaled in the adjacent cup, a nut on said bolt adapted to hold said cups in close contact, an integral lug on the same section with the bolt a slidable lock thereon adapted to hold said nut from turning and means for holding said pipe-coupling in a folded position.

4. In a device of the class described the combination with joint-cups having pipe extensions and interfitting faces and a packing-seat in each face, of a two-part packing therein adapted to turn with one face and move on the other, a hub formed on the center of one of said cups, a threaded bolt integral with the other adapted to pass through the hub, a nut on the protruding end thereof, an integral lug on the section carrying the bolt and a lock movably engaged thereon adapted to hold said nut from turning.

5. In a jointed connection for pipe-coupling the combination with a fixed section having a horizontal plate, of a vertical section having a similar plate, packing between said plates, segmental recesses in said plates for connecting the sections to allow said vertical section to oscillate, an intermediate pipe-section having jointed connection with the vertical section, an end section having jointed connection with the intermediate section and adapted to fold beneath the same, a coupling-head thereon and a plate adapted to close the head when not in use.

6. A jointed metal pipe-coupler for railway-cars comprising a fixed section, a horizontally-oscillating section, an intermediate section having a stop thereon, and an end section provided with a coupling-head and adapted to fold over and rest upon the stop of the intermediate section and adapted thereby to be supported in an upright position.

7. A jointed metal pipe-coupler comprising a fixed section, a horizontally-oscillating section, an intermediate section, an end section having a coupler-head at the free end thereof, and a cover-plate affixed to the intermediate section to close against the open face of the coupler-head.

8. The coupler-head for train-pipe connection comprising a cup-joint having a gasket seated in and projecting from the face thereof, a segment rim-flange projecting therefrom, an overhanging segment-flange to engage the rim-flange of the connecting joint-section, and a set-bolt passing through the flange of the coupler-head.

In testimony whereof I have hereunto subscribed my name in the presence of two subscribing witnesses.

GEORGE D. PETTINGELL.

Witnesses:
C. W. HILLS,
ALFRED C. ODELL.